(No Model.)  2 Sheets—Sheet 1.
J. McMURRIN.
WATER ELEVATOR.
No. 577,314. Patented Feb. 16, 1897.
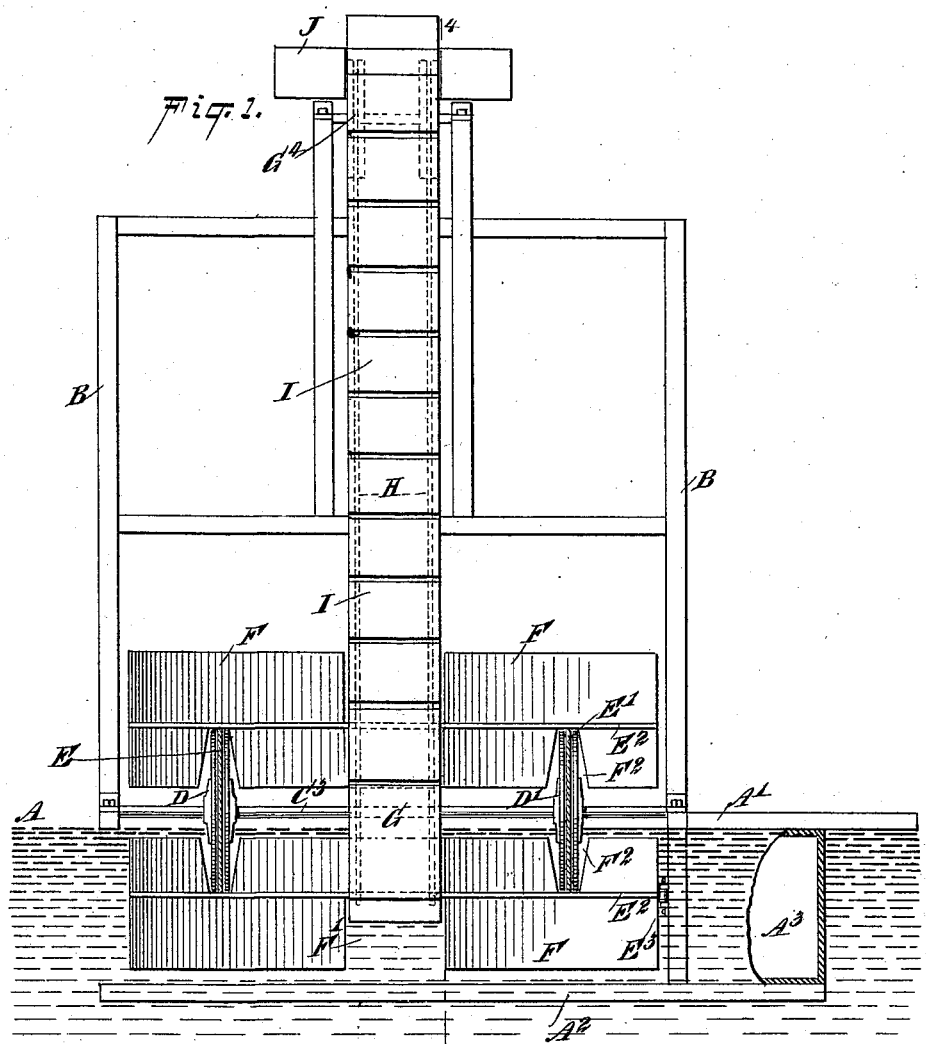
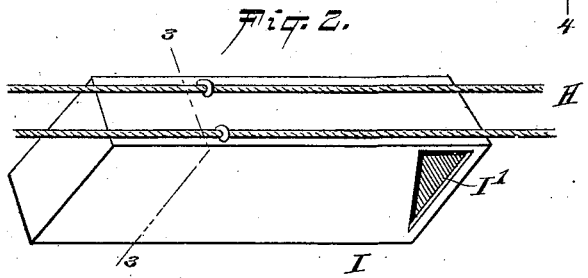
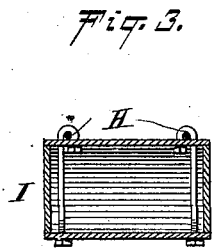
WITNESSES:
William P. Goebel
Rev. G. Hoster
INVENTOR
J. McMurrin
BY Munn & Co.
ATTORNEYS.

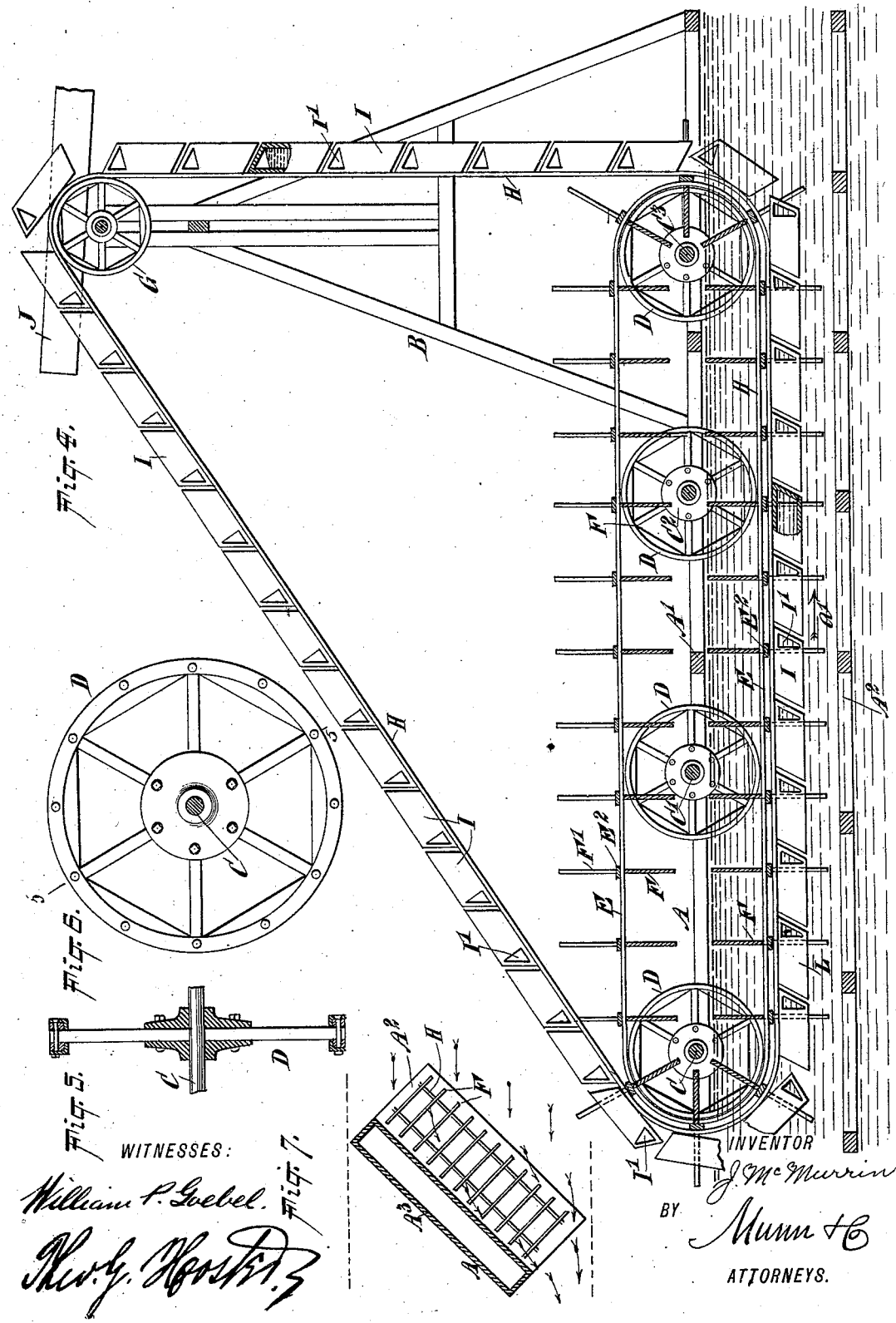

UNITED STATES PATENT OFFICE.

JOSEPH McMURRIN, OF SHOSHONE, IDAHO.

WATER-ELEVATOR.

SPECIFICATION forming part of Letters Patent No. 577,314, dated February 16, 1897.

Application filed November 1, 1895. Serial No. 567,634. (No model.)

*To all whom it may concern:*

Be it known that I, JOSEPH MCMURRIN, of Shoshone, in the county of Lincoln and State of Idaho, have invented a new and Improved Water-Elevator, of which the following is a full, clear, and exact description.

The invention relates to water-elevators such as shown and described in Letters Patent of the United States No. 528,015, granted to me on October 23, 1894.

The object of the present invention is to provide a new and improved water-elevator which is simple and durable in construction and arranged to utilize the current of water in a stream to the fullest advantage and without danger of driftwood interfering with the working parts.

The invention consists principally of an endless paddle-wheel having its lower run extending into the water and an endless bucket-elevator having its lower run carried by the lower run of the said paddle-wheel.

The invention also consists of certain parts and details and combinations of the same, as will be fully described hereinafter, and then pointed out in the claim.

Figure 1 is an end elevation of the improvement with part in section. Fig. 2 is an enlarged perspective view of one of the elevator-buckets. Fig. 3 is a cross-section of the same on the line 3 3 of Fig. 2. Fig. 4 is a sectional side elevation of the improvement on the line 4 4 of Fig. 1. Fig. 5 is an enlarged cross-section of one of the paddle-wheels on the line 5 5 of Fig. 6. Fig. 6 is a side elevation of the same with its shaft in sections, and Fig. 7 is a reduced sectional plan view of the improvement as arranged in the stream.

The improved water-elevator is provided with a float A, having an upper deck $A'$, a lower deck $A^2$, and a breakwater $A^3$, made in the form of a box and connecting the decks $A'$ and $A^2$ with each other at one side thereof, as indicated in Figs. 1 and 7, it being understood that the said breakwater extends throughout the length of the float.

The lower deck $A^2$ will protect the paddles F and the parts adjacent from obstructions which may move upwardly against said parts, thus forming a guarding inclosure for them. It is the principal purpose, however, of the deck $A^2$ to assist in floating the apparatus.

The deck will be constructed of a buoyant material and will afford the greater part of the floating force.

On one end of the float is erected a tower B, and an endless paddle-wheel extends longitudinally on the float to impart a traveling motion to an endless bucket-elevator, as hereinafter more fully described. On the upper deck $A'$ of the float are journaled a series of transversely-extending shafts C, $C'$, $C^2$, and $C^3$, forming part of the endless paddle-wheel, and on each of the said shafts is secured a set of wheels D and $D'$, preferably grooved, and over which pass ropes or cables E and $E'$, respectively connected with each other by transverse bars $E^2$, carrying paddles F, having their wings extending equidistant in opposite directions, as illustrated in the drawings, the said paddles passing between the upper and lower decks $A'$ and $A^2$ on the lower runs of the ropes or cables. Thus when the device is set in a running stream the current of the water will act on the paddles between the decks $A'$ and $A^2$ and propel the paddles forward in the direction of the arrow $a'$, thereby rotating the wheels D and $D'$ and shafts C, $C'$, $C^2$, and $C^3$.

The bucket-elevator for carrying the water from the stream to an elevation is provided with endless ropes or cables H and buckets I, secured thereon, the said ropes H and buckets passing under the cross-bars $E^2$ at their middle, the downward-extending wing of the paddles F being cut out, as at $F'$, for the accommodation of the buckets, as will be readily understood by reference to Fig. 1. The ropes H and buckets I extend upward from the rear wheels D $D'$ on the shaft $C^3$ to pass over a wheel G, journaled in the top of the tower B, the ropes and buckets then extending forwardly and downwardly to pass into the cut-out portions $F'$ of the paddles F and onto the cross-bars $E^2$ at the forward wheels D $D'$ on the shaft C. The ropes H and buckets I between the front and rear wheels D $D'$ on shafts C and $C^3$ are submerged in the water in passing through the float. The inwardly-extending wings of the paddles F are each formed with two notches $F^2$ to permit the paddles to pass the wheels D $D'$, as will be readily understood by reference to Fig. 1. In order to ease the movement of the paddles F when passing through the water in the float, I provide the inner wall of the latter with vertically-disposed friction-rollers $E^3$, (see Fig. 1,) adapted to be engaged by the inner edges of the paddles F and ends of the bars $E^2$.

It is understood that by the arrangement described the lower run of the endless bucket-elevator is carried by the lower run of the endless paddle-wheel, while the rear upward run and the inclined forward run of the elevator extend loosely between the wheel G and the rear and front ends of the float.

Each of the buckets I is provided with inclined ends and closed on all sides, as well as on the top and bottom, the sides of each bucket, however, being provided near its upper end with openings I' to permit the water to pass into the said buckets while the latter are immersed in the water between the decks A' and $A^2$. When the buckets reach the rear wheels D D' on the shaft $C^3$, they are completely filled with water and remain so during their upward vertical movement from the said wheels to the wheel G, the said buckets discharging the water through the openings I' into chutes J, arranged on the top of the tower B on opposite sides of the buckets. The empty buckets then pass downward and forward to again pass into the water at the front shaft C to be refilled and finally carried upward and emptied, as above explained.

It will be seen that by the arrangement described the endless paddle device propels the elevator so that the buckets can fill with water, be lifted a suitable height, and then discharge the water into chutes for carrying the water to the desired place. The float is preferably set at a quartering position in the running stream with the breakwater $A^3$, as shown in Fig. 7, and this quartering position of the float is a protection against drift, and also allows the current to strike the paddles separately. All the paddles in a manner are front paddles, as one does not protect the other from the force of the current.

Having thus fully described my invention, I claim as new and desire to secure by Letters Patent—

A water-elevator having a longitudinally-extending float, an upper and lower deck formed of buoyant material and projecting laterally from one side of the float, the float forming a breakwater at one side of the decks, the upper deck lying level with the surface of the water when the apparatus is in use, the decks being adapted to float evenly with the breakwater when in use, a tower rising from the upper deck, a series of transverse shafts mounted on the upper deck, pulleys respectively fixed to the shaft, an endless belt passed over the pulleys, paddles carried by the belt, and an endless water-conveyer having one run passed vertically up the tower and a second run passed diagonally downward to meet a horizontal run passing between the decks, substantially as described.

JOSEPH McMURRIN.

Witnesses:
W. J. SMITH,
R. M. McCOLLUM.